United States Patent
Freudewald et al.

[15] 3,697,606
[45] Oct. 10, 1972

[54] PARA-PHENYLPHENOL PREPARATION

[72] Inventors: Joachim E. Freudewald, Morris Township; Frederic M. Konrad, Basking Ridge, both of N.J.

[73] Assignee: Union Carbide Corporation

[22] Filed: March 20, 1968

[21] Appl. No.: 714,410

Related U.S. Application Data

[63] Continuation-in-part of Ser. No. 581,153, Sept. 22, 1966, abandoned.

[52] U.S. Cl. ................260/620, 260/575, 260/580, 260/619 A, 269/619 D, 260/621 R, 260/668 F, 260/668 R, 260/683 R, 260/683.9
[51] Int. Cl. .............................................C07c 39/12
[58] Field of Search ......260/619 A, 620, 621, 621 E, 260/621 H

[56] References Cited

UNITED STATES PATENTS

| | | |
|---|---|---|
| 1,879,337 | 10/1932 | Laage ....................260/621 X |
| 2,497,503 | 2/1950 | Jones.........................260/621 |
| 2,730,552 | 1/1956 | Williamson............260/619 X |

OTHER PUBLICATIONS

Noller (I), " Chemistry of Organic Compounds" pp. 516– 517
Noller (II), " Chemistry of Organic Compounds," pp. 94– 96 [1965], OD253N65

Primary Examiner—Leon Zitver
Assistant Examiner—Norman Morgenstern
Attorney—Paul A. Rose, Aldo John Cozzi and James C. Arvantes

[57] ABSTRACT

The process of preparing para-phenylphenol by heating para-hexenylphenol in the liquid phase in the presence of a stoichiometric excess of a hydrogen acceptor, and a palladium, nickel or platinum catalyst.

9 Claims, No Drawings

PARA-PHENYLPHENOL PREPARATION

This application is a continuation-in-part of Ser. No. 581,153, filed Sept. 22, 1966, now abandoned.

BACKGROUND

This invention relates to the preparation of para-phenylphenol. More particularly this invention relates to the preparation of para-phenylphenol through the novel dehydrogenation of para-cyclohexenylphenol in an exothermic hydrogen transfer reaction and additionally the preparation of para-phenylphenol from phenol and cyclohexanone through the production of intermediate para-cyclohexenylphenol.

While many different types of phenols have been proposed and used in the preparation of phenolic resins, para-phenylphenol has found particular utility in the preparation of phenolic resins which are to be used in coating formulations such as varnishes and adhesives. Accordingly, the demand for this phenol has increased to the point where it is in short supply.

U.S. Pat. No. 1,862,000 discloses a process for the preparation of para-phenylphenol from para-cyclohexylphenol. In this process the para-cyclohexylphenol is dehydrogenated by heating at a temperature of from 185° C to about 350° C in the presence of a platinum, palladium or nickel catalyst. The dehydrogenation does not go through the para-cyclohexenylphenol stage and there is an evolution of a hydrogen throughout this endothermic reaction.

The present invention proposes a method for the dehydrogenation, at significantly low temperatures, of a readily available, easily made material to produce the desired phenol. Additionally the process of this invention is readily incorporated with a relatively simple, known process for the production of para-cyclohexenylphenol in which a highly useful and easily operated by-product is obtained.

SUMMARY

In accordance with the present invention it has been found that para-cyclohexenylphenol can be dehydrogenated in an exothermic hydrogen transfer reaction to form para-phenylphenol by heating the para-cyclohexenylphenol in the liquid phase in the presence of an excess of hydrogen acceptor which reacts with hydrogen at a greater rate than the para-cyclohexenylphenol, and a nickel, palladium or platinum catalyst at a temperature of from about 100°–180° C.

DESCRIPTION

As indicated above, the present process for the dehydrogenation of para-cyclohexenylphenol is especially suited for use in combination with the process for producing para-cyclohexenylphenol from phenol and cyclohexanone. This process and the dehydrogenation step are illustrated by the reaction diagrams which follow:

1. Condensation reaction

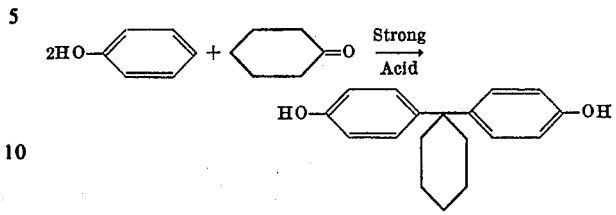

2. Cleavage reaction

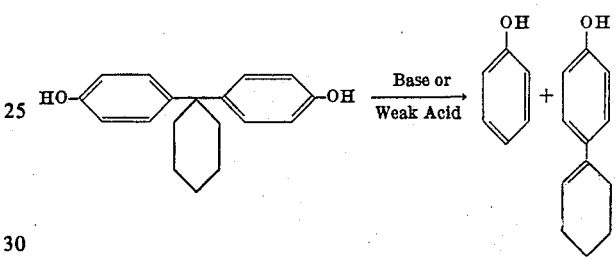

3. Exothermic hydrogen transfer reaction

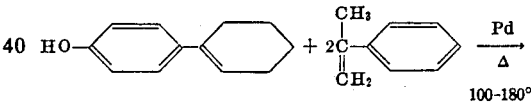

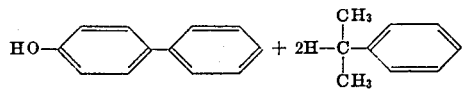

Briefly stated the condensation reaction (1) consists of the condensation of cyclohexanone with an excess of phenol at a temperature of about 60° C in the presence of a condensation catalyst of hydrochloric acid and ethyl mercaptan promoter.

In this condensation reaction a temperature of from about 40° to about 120° C can be employed although as indicated 60° C is an effective temperature and is preferred.

The condensation catalyst should be present in the reaction mixture in a catalytic amount. While this amount can be from about 0.1 to about 50 weight percent based on phenol, an amount of about 0.5 is preferred. Aqueous or anhydrous HCl may be used.

Condensation catalysts other than hydrochloric acid-ethyl mercaptan can also be employed. Such other catalysts include sulfuric acid, p-toluene sulfonic acid, phosphoric acid, $BF_3$, $ZnCl_2$, $Al_2Cl_3$, $SnCl_4$ or cation exchange resins with transfer acidic groups.

The reaction rate can be enhanced by the addition of a promoter. Alkyl mercaptans such as methyl mercaptan, ethyl mercaptan, n-propyl mercaptan, isopropyl mercaptan or n-butyl, isobutyl or t-butyl mercaptans or higher molecular weight alkyl mercaptans are active promoters. Other sulfur compounds such as hydrogen sulfide, thiophenol, thioalcohol, thioacids, polymeric thioacetone, dialkylsulfides are also active promoters and can effectively be used. Analogous selenium compounds can also be used.

A wide range of promoter concentrations can be employed in amounts dependent upon the particular type used. Ethyl mercaptan as low as 0.05 percent and as high as 10 percent can be used. However 0.1 percent to 0.5 percent of ethyl mercaptan was found preferable for reaction with hydrochloric acid catalyst at a temperature of 60° C.

Although two moles of phenol per mole of cyclohexanone are required to form the bisphenol (1,1-bis(p-hydroxyphenyl)-cyclohexane), an excess of phenol is desirable to enhance the yield of product and minimize side reactions. Although a wide range 5 to 30 moles/mole cyclohexanone can be used, the preferred range is 8–20 moles/mole cyclohexanone. However, because of the particular effectiveness, low cost and easy removal of the hydrochloric acid-ethyl mercaptan catalyst of this system is preferred.

Diluents can be employed in the condensation reaction if desired. Suitable diluents include aromatic hydrocarbons, chlorinated aliphatic hydrocarbons, glacial acidic acid, and the like.

This condensation reaction is usually complete after a reaction period of about 1–3 hours at 60° C although longer or shorter periods can be employed and will of course vary with other reaction conditions.

When the condensation reaction is complete, the catalysts and water are removed. This is effectively accomplished by distillation although other conventional methods can be employed if desired. The 1,1-bis(p-hydroxyphenyl)cyclohexane adduct is conveniently separated from the excess phenol by centrifugation but again, other conventional separation means can be employed if desired.

In the cleavage reaction the 1,1-bis(4-hydroxyphenyl)-cyclohexane is cleaved by heating at a preferred temperature from about 180° to about 200° C in the presence of a basic or acid cleavage catalyst.

While as indicated the cleavage reaction can be readily effected at temperatures in the range of from about 180° to about 200° C, temperatures above and below this range can be employed. For example, temperatures from about 140° to about 300° C are effective although the narrower range is preferred.

Effective cleavage catalysts include alkali metal hydroxides such as sodium hydroxide, potassium hydroxide, lithium hydroxide and the like; alkaline earth metal hydroxides such as magnesium hydroxide, barium hydroxide, and the like as well as carbonates, acetates, phenoxides, and salts of weak organic acids.

Acids include such acids as p-toluene sulfonic acid, acidic Fuller's Earth and the like, as well as weakly acidic acid salts such as potassium bisulfite, aluminum chloride, stannous chloride, and other acidic metal chlorides. The cleavage catalysts are employed in a catalytic amount. This amount is generally from about 0.01 to about 10.0 weight percent based on bisphenol, although amounts of from 0.1 to 0.5 weight percent based on the bisphenol are preferred. It has also been found desirable to employ the cleavage catalysts especially the strongly basic catalysts as aqueous solutions.

The cleavage products, phenol and para-cyclohexenylphenol can then be heated in the liquid phase, preferably in a solvent with an excess of a hydrogen acceptor in the presence of a nickel, palladium or platinum catalyst over a temperature of from about 100° to about 180° C.

Other catalysts which can be used in place of nickel, platinum or palladium are rhodium, ruthenium, platinum oxide, platinum black, cobalt, nickel sulfide, iron and molybdenum.

The hydrogen acceptor employed in the hydrogen transfer reaction must react with hydrogen at a greater rate than the hydrogen donor, para-cyclohexenylphenol. Several types of compounds having this greater affinity to hydrogen than the para-cyclohexenylphenol can be effectively utilized as hydrogen acceptors in the process of this invention. Illustrative of such hydrogen acceptors are organic compounds containing ethylenic unsaturation such as ethylene, propylene and the like, organic compounds containing acetylenic unsaturation such as acetylene, propyne, and the like, organic compounds containing azo groups such as azobenzene and the like, and nitro and carbonyl compounds. Particularly effective hydrogen acceptors are organic compounds containing conjugated double bonds such as $\alpha$-methylstyrene, nitrobenzene, para-nitro-phenol, para-chloro nitrobenzene, maleic anhydride diketone methyl acetylene, indene, crotonic acid, sorbic acid, and the like. Of these hydrogen acceptors $\alpha$-methylstyrene, para-nitrophenol and para-chloro nitrobenzene are preferred in that the use of these compounds as hydrogen acceptors provides exceptionally useful by-products, i.e. cumene, para-amino phenol and para-chloro aniline which is readily converted to para-aminophenol.

The most preferred acid acceptor is $\alpha$-methylstyrene in that all reactants and products are soluble in this compound at the reaction temperature and in cooling to room temperature the product para-phenylphenol is insoluble and separates from the reaction liquor in high purity.

The product of the hydrogen transfer reaction can then be effectively purified by fractional distillation to yield pure para-phenylphenol and hydrogenated by-product which can be separated.

A particularly desirable feature can be provided when the dehydrogenation process of this invention is used in combination with the p-cyclohexenylphenol process illustrated by reaction steps (1) and (2) above. This feature is that steps (2) and (3) can be combined and carried out as a single step preferring simultaneous operation. This naturally reduces overall process time and increases efficiency.

The following examples are intended to further illustrate the present invention without limiting the same in any manner. All parts and percentages are by weight unless indicated otherwise.

EXAMPLE 1

423 g. (2.43 moles) p-Cyclohexenylphenol are heated with 2,498 g. α-methylstyrene and 168 g. 5 percent palladium on powdered charcoal at 150° C for 8 hours. The catalyst is filtered from the hot reaction mixture. The filtrate is vacuum distilled at 100 mm Hg to remove 776 g. of a cumene rich fraction. The residue is cooled to room temperature to crystallize out 275 g. wet crystals. The crystals are dried to constant weight to yield 245 g. pure p-phenylphenol (m.p. 163.8°–165.0° C). This represents a 49 percent yield.

EXAMPLE 2

539 g. of p-Cyclohexenylphenol are heated with 1,650 g. molten liquor from Example 1 plus 1,560 new α-methylstyrene for 6 hours at 150° C with the same batch of catalyst as is used in Example 1. The reaction mass is filtered to recover the catalyst. The filtrate is vacuum distilled to remove 1,175 g. cumene rich distillate. The residue is cooled to room temperature to crystallize out p-phenylphenol. Crystals are filtered, washed with cumene and dried to yield 372 grams p-phenylphenol (m.p. 164.8°–165.0° C). Yield is 74.2 percent.

EXAMPLE 3

174 g. (1.0 Mole) p-cyclohexenylphenol and 615 g. (5.0 moles) p-nitrobenzene are heated to 150°–180° C for 8 hours with 50 g.–5 percent palladium on powdered charcoal. The mixture is filtered to remove the catalyst. The filtrate is distilled to yield an aniline nitrobenzene fraction and 136 g. p-phenylphenol (80 percent yield).

EXAMPLE 4

940 g. phenol and 98 g. cyclohexanone are heated at 70° C in the presence of 4.7 g. anhydrous hydrogen chloride and 2.0 g. ethyl mercaptan for 3 hours. The reaction mixture is distilled under reduced pressure to remove the hydrochloric acid, water of reaction and the ethyl mercaptan and xylene. The bis-phenol (1,1-bis(4-hydroxyphenyl)cyclohexane) phenol adduct is filtered from the reaction mixture and washed with phenol. 440 g. of crystals containing 260 g. bisphenol are obtained.

The crystals are heated to 180° C for 3 hours with 0.27 g. sodium hydroxide under a nitrogen atmosphere. The reaction mixture is distilled under reduced pressure to yield a fraction which is essentially phenol and 157 g. p-cyclohexenylphenol.

The cyclohexenylphenol is heated with 1,060 g. α-methylstyrene and 60 g. 5 percent palladium catalyst supported on powder charcoal. The reaction mixture is refluxed atmospherically for 6 hours. The hot reaction mixture is filtered to remove the catalyst. The filtrate is distilled to remove a cumene rich fraction cooled to room temperature to crystallize out the product. 77 g. pure p-phenylphenol are obtained by filtration from the mother liquor. Analysis by VPC shows a similar amount of p-phenylphenol remains dissolved in the mother liquor which may be recovered by recycling to the process.

EXAMPLE 5 p-cyclohexylphenol is heated with a stoichiometric excess α-methylstyrene and a catalytic amount 5 percent palladium on powdered charcoal at 150°–180° C for 8 hours. The catalyst is filtered from the hot mixture. The starting product is recovered indicating no reaction has taken place.

What is claimed is:

1. The process of preparing para-phenylphenol by the dehydrogenation of para-cyclohexenylphenol in an exothermic hydrogen transfer reaction by heating the said para-cyclohexenylphenol in the liquid phase in the presence of a stoichiometric excess of a hydrogen acceptor which is selected from the group consisting of ethylenically unsaturated hydrocarbons, acetylenically unsaturated hydrocarbons, azobenzene, α-methylstyrene, nitrobenzene, para-nitrophenol, para-chloronitrobenzene, maleic anhydride, diketone methyl acetylene, indene, crotonic acid and sorbic acid; and a catalyst selected from the group consisting of nickel, palladium, platinum, rhodium, ruthenium, platinum oxide, platinum black, cobalt, nickel sulfide, iron and molybdenum, at a temperature of about 100° C to about 180° C.

2. The process of preparing para-phenylphenol by the steps comprising:
   a. condensing about two moles of phenol with about one mole of cyclohexanone in the presence of a strong acid condensation catalyst at a temperature of from about 40° C to about 120° C to form 1,1-bis(p-hydroxyphenol)cyclohexane;
   b. cleaving the formed 1,1-bis(p-hydroxylphenyl)-cyclohexane in the presence of an acidic or basic cleavage catalyst at a temperature of from about 150° C to about 250° C to form para-cyclohexenylphenol; and
   c. dehydrogenating the formed para-cyclohexenylphenol in an exothermic hydrogen transfer reaction by heating the reaction product of step (b) to a temperature of from about 100° C to about 180° C in the liquid phase with a stoichiometric excess of a hydrogen acceptor which is selected from the group consisting of ethylenically unsaturated hydrocarbons, acetylenically unsaturated hydrocarbons, azobenzene, α-methylstyrene, nitrobenzene, para-nitrophenol, para-chloronitrobenzene, maleic anhydride, diketone methyl acetylene, indene, crotonic acid and sorbic acid; and a catalyst selected from the group consisting of nickel, palladium, platinum, rhodium, ruthenium, platinum oxide, platinum black, cobalt, nickel sulfide, iron and molybdenum.

3. The process of claim 2 wherein the condensation catalyst is hydrochloric acid and a lower alkyl mercaptan.

4. The process of claim 2 wherein the cleavage catalyst is a basic catalyst.

5. The method of claim 2 wherein the cleavage catalyst is an alkali hydroxide.

6. The method of claim 2 wherein the cleavage catalyst is a weak acid.

7. The method of claim 2 wherein the cleavage catalyst is sodium hydroxide.

8. The process of claim 1 wherein the hydrogen acceptor is α-methylstyrene.

9. The process of claim 1 wherein the hydrogen acceptor is p-nitrophenol.

* * * * *